Sept. 4, 1962  R. L. SPIELES  3,052,587
DIELECTRIC EMBOSSING
Filed Oct. 8, 1957
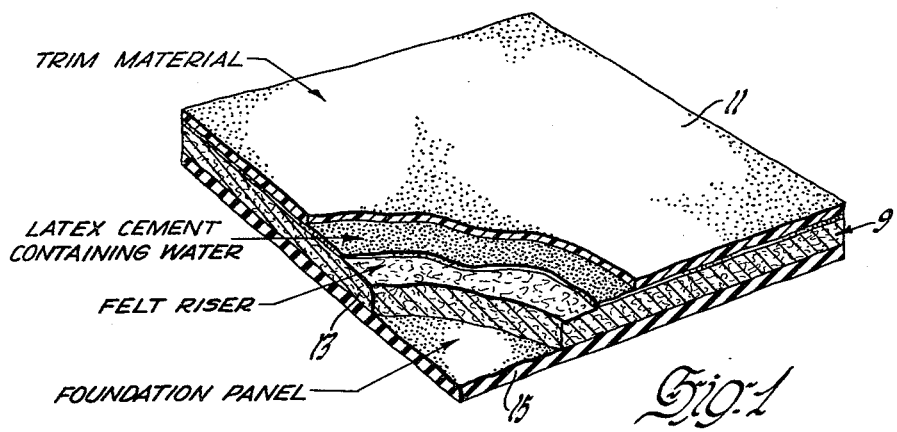
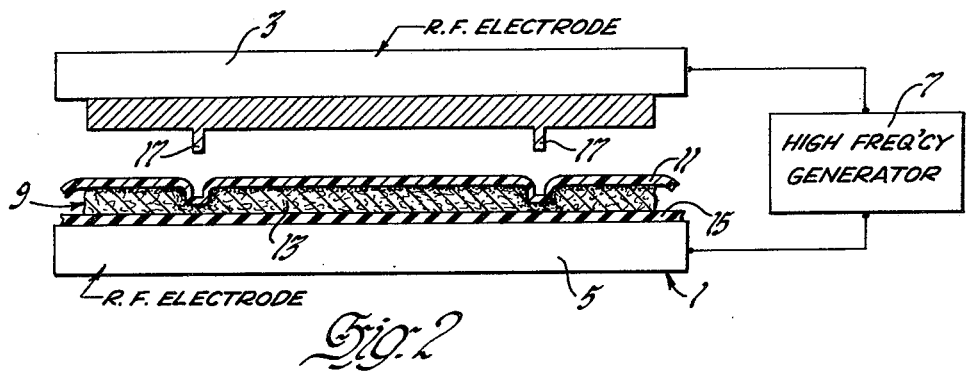
INVENTOR.
Robert L. Spieles
BY
R. F. Barnard
ATTORNEY United States Patent Office 3,052,587
Patented Sept. 4, 1962

3,052,587
DIELECTRIC EMBOSSING
Robert L. Spieles, St. Clair Shores, Mich., assignor to General Motors Corporation, Detroit, Mich., a corporation of Delaware
Filed Oct. 8, 1957, Ser. No. 688,853
1 Claim. (Cl. 156—220)

This invention relates to a process for embossing decorative articles and to the product resulting therefrom, and more particularly to a process for forming a tooled surface on a dielectrically embossable article.

In the manufacture of decorative trim assemblies, it has been the practice to provide depressed trim lines in the trim material by an embossing operation whereby, in those instances where the assembly comprises a trim material positioned on a riser or filler material, the desired design is impressed on the assembly by application of pressure and heat to permanently compress the riser or filler material, the trim material being bonded thereto and similarly depressed in corresponding portions. One such method uses a dielectric press to apply heat and pressure to an assembly comprising a trim material positioned on a cotton padding riser layer which is impregnated with a heat-fusible plastic and is supported on a fiber board backing. Upon operation of the press an embossed pattern is produced wherein the trim material is bonded to the base sheet through the riser, the plastic in the riser along the embossed lines having been melted and cured, thus serving as the bonding adhesive.

Such a method has several inherent serious problems. The process and resulting product are costly by reason of the need for a specially prepared riser material having permeable properties even when compressed (to enable the adhesive to penetrate therethrough) and the need for adhesive material having peculiar electrical properties to enable it to be selectively heated dielectrically. Likewise, the resulting bond is generally hard and lacking in flexibility with a tendency to break loose when subjected to hard wear as in the back rest and seat panels of automobiles. Also, the plastic on the riser in the elevated portions of the embossed design tends to powder and the resultant duct creates a strike through problem, especially where the trim is a cloth. Further, the definition or sharpness of the embossed pattern is imperfect by reason of the heating effects in portions of the assembly adjacent the embossing blades.

It is, therefore, an object of this invention to provide a simple and inexpensive process for embossing a trim assembly. It is another object of this invention to provide a process for embossing whereby both the elevated and depressed portions of the trim material are tooled. It is another object of our invention to provide a process for embossing a trim assembly wherein the definition of the design is sharp and clear. It is another object of this invention to provide a process for embossing wherein the bond between the several materials of the assembly along the embossed line is both soft and strong. It is another object of this invention to provide an embossed trim assembly wherein both the elevated and the depressed portions of the design are tooled. It is another object of this invention to provide an embossed assembly wherein the elevated portions of the design adjacent the embossed lines are sharp and clearly distinguished from the depressed portions.

A similar method and article is described in copending application Serial No. 538,914, Dusina et al., filed October 6, 1955, now Patent No. 2,946,713. In the Dusina patent a sponge rubber riser is utilized with the dielectrically embossable trim material. While the sponge rubber riser results in an entirely satisfactory embossed article, the cost of such material has inhibited the commercial use of such articles. This is particularly true in that sponge rubber has many characteristics such as softness to touch, water proof, etc. which are unnecessary in many, if not most, of the applications where such articles are utilized. For instance, these characteristics are unnecessary when such an article is used as an interior door trim pad.

As a consequence of the cast factor involved in the use of sponge rubber, an effort was made to find a material having those necessary qualities of spong rubber such as resilience, if not softness, ability to take a set for embossment, etc., but which material would be appreciably cheaper than sponge rubber. It was discovered that the riser material could be made of what is termed a "felt" substance which is actually a waste paper and rag material. The "felt" riser is formed to have the characteristics in general required for such embossed articles. In addition to meeting the necessary structural requirements, however, the paper "felt" riser mounted on a backing board is three to five times less expensive than sponge rubber. To illustrate with some typical figures, the backed "felt" riser is approximately 5 to 10 cents a square foot whereas comparable size sponge rubber is 25 to 30 cents a square foot the latter without backing material which is ultimately required and adds further to the cost of the sponge rubber article.

While the method of embossing the sponge rubber trim assembly as set forth in the Dusina et al. patent is, in general, similar to the present method of creating an embossed "felt" trim assembly it is specifically different. More explicitly in the Dusina et al. method the sponge rubber is dielectrically fused beneath the embossing die as a consequence of which the rubber takes an irreversible set. On the other hand, the "felt" riser, particularly when exposed to controlled quantities of water, will take a set during embossment, however, it is necessary to add a substance to insure the permanence of the set.

Thus it is the purpose of the present invention to provide a method for dielectrically embossing a trim material mounted upon a waste paper or "felt" riser material in a way to insure an enduring set in the latter material as well as good embossment definition in the trim and riser materials.

For a more complete understanding of the invention, reference should be had to the following description taken in conjunction with the accompanying drawing in which:

FIGURE 1 is an isometric view, with parts broken away and in section to better illustrate the invention, of the trim assembly components; and FIGURE 2 shows the trim assembly in a dielectric press after embossment.

Dielectric heating is a selective heating process whereby heat is developed internally in an electrical insulating material by frictional heating brought about by the rotating and oscillating movement of the atoms and molecules of the insulator and the materials contained therein under the influence of an alternating current field. It is obvious that the more rapidly the current field alternates, the faster the movement and the more heat generated in the material. In practice, the frequency utilized for dielectric heating is in the range of two megacycles to 200 megacycles per second.

It has been found that the amount of heat actually developed in an insulating material when heated dielectrically depends on (1) The composition and physical characteristics of the material.
(2) The voltage placed across the material.
(3) The frequency of the alternating voltage.

(4) The time the voltage is applied.
(5) The rate of heat loss.

Likewise, it has been found that the suitability of any particular insulating material for dielectric heating is defined by the following factors:

(1) Dielectric constant (a measure of the capacity of the material to store electrical energy when subjected to an alternating current field).
(2) Power factor (measure of the amount of energy "lost" in the material by conversion to heat on changing of the current field).
(3) Dielectric strength (the amount of voltage the material can withstand before breaking down or arcing over. It is of extreme importance not to exceed the dielectric strength of the materials used in embossing dielectrically, since this would not only burn holes in the trim assembly but may also burn the costly embossing plates).

Referring now to FIGURE 2, there is schematically shown a dielectric press 1 having upper and lower platens 3 and 5, respectively, in series with a high frequency generator 7. Positioned within the press 1 is a laminated trim assembly 9 comprising a sheet of trim material 11 positioned on a layer of riser material 13 formed of a paper waste material hereinafter referred to as "felt," and having a backing sheet 15 secured thereto. The trim assembly 9 is positioned on the flat surfaced platen 5. As is clearly shown in FIGURE 2, the upper platen 3 is formed to serve as the embossing die by providing a plurality of embossing blades 17 thereon. The blades 17 are set on edge in the desired trim line pattern and are thus adapted to impart the depressed pattern or design to the trim assembly by application of pressure and heat upon the closing of the press and the actuation of the high frequency generator 7.

By "backing sheet" or other similar descriptive term it is meant to include flexible materials such as fabrics formed of cotton, wool, rayon, glass fibers, synthetic fibers, etc., paper, leather, etc. as well as rigid and semi-rigid materials such as composition board, fiberboard, paper laminates, synthetic sheets and metals; by "trim material" it is meant to include leather, plastic materials, i.e., the vinyl chloride, vinylidene chloride, and other similar synthetics formed into flexible sheets with finishes simulating leather, woven fabrics, etc., and cloth materials formed of woven fibers of the natural, synthetic and glass type; by the term "felt" it is meant, in general, to specify non-rubber materials fabricated in such a way as to have interstitial voids providing a certain amount of resilience to the touch and capable of recovering its shape when temporary deforming pressures are removed; and further which material is capable of taking a set with the application of pressure and heat. It is also desirable that such material be chemically inert at least relative to the other trim assembly components. While other non-rubber materials may be available for this purpose, it has been found eminently satisfactory to utilize the aforenoted "felt" which in addition to possessing the desired physical characteristics, supra, is considerably less expensive than sponge rubber formerly used. The "felt" is actually a blend of torn up waste paper and rags which are blended to provide the requisite strength. A slurry of the mixture is screened to remove the water in conformance with paper making practice leaving the residual sheeted "felt." Either cotton or wool rags may be used with cotton being cheaper.

It has been discovered that the "felt" may be dielectrically embossed by the addition thereto of a conditioning material such as water as is the case with sponge rubber. It has been found that upon dielectrically embossing with such conditioning material substantially uniformly distributed therethrough in a controlled amount, the felt compressed under the embossing blades tends to be mechanically upset and stressed so as not to return to its original shape over a short period of time. In the case of foam rubber, under similar circumstances, there is a fusion of the sponge rubber under the embossing blades as opposed to the mechanical set which occurs with the "felt."

The embossment of the "felt" assemblies in accordance with the subject discoveries results in an embossed article not only having a strong and highly pliable bond in the embossed line but also in an embossed pattern having good definition. This is due to the fact that not only are the riser and trim materials 13 and 11, respectively, tooled in the depressed areas by the embossing blades but that the trim material is also tooled in the elevated areas by the hot vapors of the conditioning material escaping into the elevated portions from the dielectrically heated depressed portions. The degree of tooling in the elevated areas may be conveniently controlled by controlling the quantity of moisture present in the assembly. It is especially important to control the vapor escape rate when working with such trim materials as genuine leather and the plastics since it has been found that such materials have a tendency to blister and/or harden and dry out when the vapor is not removed at a rapid enough rate. As pointed out above, the dielectric embossing process is base on the selective heating of an insulating material in an alternating current field. The dielectric embossment of paper "felt" has not been possible heretofore because of the fact that the electrical characteristics of the material were such as to preclude its being selectively heated in a trim assembly of the type herein discussed.

We have found that a moisture content of from 2 to 7% by weight of the paper "felt" produces a riser material suitable for dielectric embossing. We have likewise found that a moisture content of from 4 to 5% was optimum under substantially all operating conditions such as are set forth hereinafter. In this regard, we have found that a moisture content above 5% acted to decrease the efficiency of the process because of the waste in power in generating excessive steam. Correspondingly, a moisture content below 2% reduced the power factor to a point where the heating selectivity was lost. As previously stated, it is found that the water alters the electrical properties of the "felt" so that selective heating may be obtained. At the same time, it appears that the presence of the water and/or water vapor acts to soften the "felt" enabling it to take a set more easily under the influence of heat and applied pressure. Further, it is found that the generated vapor acts to tool and highlight the embossed effect in its action on the trim material in the elevated portions of the design.

It is likewise found that a very satisfactory embossed pattern is obtained by applying a pressure of from about 200 to 600 p.s.i., a pressure of about 400 p.s.i. being suitable in substantially all instances. Embossing pressure serves two functions, that of obtaining adequate bond strength and that of imparting good definition to the embossed design. In the process for embossing paper "felt," the application of embossing pressure is compatible with both functions. This was not always the case where the addition of adhesives throughout the riser material was required since the compression of the riser material frequently acted to inhibit the free flow of the adhesive material therethrough with the result that the bond strength was weakened.

The dielectric embossing cycle comprises two phases from the time standpoint, the length of time during which dielectric heating takes place (the heat cycle) and the length of time that pressure is maintained on the embossed assembly after the heating is accomplished (hold time or soak time). The thermal efficiency of the dielectric heating process is improved as the heat cycle is decreased since the thermal efficiency is a function of the heat loss per unit of time, loss of heat taking place by conduction through the materials of the trim assembly to the embossing blades and flat surfaced electrode of the press. It is found that a heat cycle of from 6 to 60 seconds and a hold time of up to 10 seconds was satisfactory. However, from the standpoint of maximum efficiency, it is preferred to use a heat cycle of from about 6 to 12 seconds, about a 10-second heating cycle being suitable in most instances along with a hold time of from 6 to 10 seconds. The peak temperature reached during the heat cycle is from about 275 to 350° F., a temperature of about 325° F. being typical.

With regard to the voltage employed in this process, it is well known that the amount of electrical power absorbed in the insulator material and therefore the heat generated therein is dependent upon the voltage across the material, the heat generated varying as the square of the voltage. It is, therefore, the practice to use as high a voltage as possible in order to obtain the maximum heating effect in the shortest time possible. The limiting factor on the voltage, however, is the dielectric strength of the materials being embossed and the corona discharge effect which causes arcing along the surface of the materials. It is found that a voltage of from 1000 to 2000 volts across the trim assembly is satisfactory, the preferred voltage being about 1500 volts. Likewise, the frequency of the alternating current field is directly related to the generation of heat in the trim assembly. The higher the frequency, the more heat developed, the relationship therebetween being 1:1. Too high a frequency may not be used, however, since the standing wave losses in the equipment increases rapidly as the frequency is raised. It is found that a frequency of about 15 megacycles per second is admirably suited to this process.

In making up the trim assembly, it is found desirable to secure the trim material 11 to the paper "felt" 13 prior to embossing. While substantially any cement or adhesive compatible with the materials of the trim assembly may be used, it is preferred to use a rubber latex in order to simultaneously introduce the desired amount of moisture into the "felt." After extended development work to determine the best method for introducing the moisture, the following procedure was adopted: the back of the trim material is spray coated with a 60% solids latex emulsion at the same time that the surface of the paper "felt" upon which the trim material is to be assembled was roll coated with a 30% solids latex emulsion. The concentrations of the emulsions are stated in terms of weight percentage. The trim material and the "felt" is then assembled.

While the process is described in terms of a preferred embodiment, it should be noted that the conditioning agent may be introduced into the paper felt in any suitable manner including roll coating, spraying, tempering in a humidity chamber or by simultaneous introduction with the adhesive. Likewise, the embossing conditions may be varied in accordance with the disclosure in order to adapt conditions to specific trim assemblies. These and other modifications will be apparent to those skilled in the art and it should be understood that such modifications are intended as a part of this invention in accordance with the scope of the claim which follows.

While in case of sponge rubber the latex cement is utilized to secure the trim material to the rubber riser mainly for convenience of assembly, such cement serves an additional and critical function in the case of the paper "felt" risers. As previously mentioned sponge rubber takes an irreversible set during dielectric embossing. The latex cement in this case cannot permeate the sponge rubber riser so it cannot and, in fact, need not in any way facilitate the actual permanence of the embossment of the rubber. As a matter of fact, if the moisture were otherwise introduced into the sponge rubber, supra, the latex cement could be completely eliminated without changing the characteristics of the basic method or article realized by the teaching of Dusina et al.

With the use of paper "felt," however, the latex cement performs a critical function affecting both the method practiced and the article created. The "felt" while dielectrically embossable does not take a completely irreversible set as does sponge rubber. The cellulose fibers of the "felt" are more or less indiscriminately arranged providing the interstitial voids into which the fibers may bend during dielectric embossment and which fibers over a period of time tend to at least partially recover their original form. If this is not compensated for the article embossment might gradually tend to lose its definition. However, the latex cement will make a limited penetration of the "felt," particularly in the area of the embossing blades, and will accordingly stiffen or fix the original set given to the "felt." Thus the latex insures the durability of the embossment of the "felt" riser material and in that way emulating this fusion-achieved feature of sponge rubber but at a substantially reduced cost.

It is apparent that certain variations may be made within the scope of the inventive concept set forth in the hereinafter appended claim.

I claim:

A method for dielectrically embossing a decorative felt panel comprising the steps of forming an assembly of a sheet of trim material and a sheet of nonfusible low power factor fibrous felt riser material plus a backing sheet, increasing the form retention characteristics of the felt material and increasing the power factor of the riser material to a value suitable for dielectric heating by adding an aqueous latex adhesive thereto in an amount containing water of from 2% to 7% by weight of the felt riser, positioning said assembly in a dielectric press and applying pressure from about 200 to 600 p.s.i. to said assembly to depress said trim material partially into the felt without deforming the backing sheet, and dielectrically heating the riser material for about 6 to 12 seconds to a peak temperature of from 275° to 350° F. to vaporize said water and to cause the said adhesive to penetrate the felt and thereby permanently fix the shape of the trim and riser materials in the elevated and depressed portions thereof.

References Cited in the file of this patent
UNITED STATES PATENTS

| | | |
|---|---|---|
| 1,967,639 | Wedger | July 24, 1934 |
| 2,068,759 | Nevin | Jan. 26, 1937 |
| 2,166,435 | Haberstump | July 18, 1939 |
| 2,213,296 | Zinser | Sept. 3, 1940 |
| 2,236,968 | Cunnington | Apr. 1, 1941 |
| 2,415,028 | Bosomworth et al. | Jan. 28, 1947 |
| 2,715,597 | Hosfield | Aug. 16, 1955 |
| 2,784,134 | Ross | Mar. 5, 1957 |
| 2,809,910 | Deddo | Oct. 15, 1957 |
| 2,914,109 | Hsu et al. | Nov. 24, 1959 |
| 2,946,713 | Dusina et al. | July 26, 1960 |

FOREIGN PATENTS

| | | |
|---|---|---|
| 706,109 | Great Britain | Mar. 24, 1954 |